United States Patent
Racz et al.

(10) Patent No.: US 8,339,962 B2
(45) Date of Patent: *Dec. 25, 2012

(54) LIMITING RLC WINDOW SIZE IN THE HSDPA FLOW CONTROL

(75) Inventors: Sandor Racz, Cegled (HU); Peter Lundh, Skarholmen (SE); Szilveszter Nadas, Budapest (HU); Zoltan C. Nagy, Szeged (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 317 days.

This patent is subject to a terminal disclaimer.

(21) Appl. No.: 12/740,215

(22) PCT Filed: Oct. 29, 2008

(86) PCT No.: PCT/SE2008/051223
§ 371 (c)(1),
(2), (4) Date: Apr. 28, 2010

(87) PCT Pub. No.: WO2009/058078
PCT Pub. Date: May 7, 2009

(65) Prior Publication Data
US 2010/0260049 A1    Oct. 14, 2010

Related U.S. Application Data

(60) Provisional application No. 60/984,449, filed on Nov. 1, 2007.

(51) Int. Cl.
*H04J 1/16* (2006.01)

(52) U.S. Cl. .......................... 370/235; 370/338
(58) Field of Classification Search .......... 370/216–228, 370/230–235, 241–253, 328, 338
See application file for complete search history.

(56) References Cited

U.S. PATENT DOCUMENTS

| | | | |
|---|---|---|---|
| 7,035,214 B1* | 4/2006 | Seddigh et al. | 370/231 |
| 2004/0072565 A1* | 4/2004 | Nobukiyo et al. | 455/436 |
| 2006/0268689 A1* | 11/2006 | Tarraf et al. | 370/229 |
| 2007/0223469 A1 | 9/2007 | Chandra et al. | |
| 2009/0034474 A1* | 2/2009 | Yavuz et al. | 370/331 |

FOREIGN PATENT DOCUMENTS

| | | | |
|---|---|---|---|
| WO | 03049320 A | 6/2003 | |
| WO | 03079577 A | 9/2003 | |

* cited by examiner

*Primary Examiner* — Ricky Ngo
*Assistant Examiner* — Kan Yuen
(74) *Attorney, Agent, or Firm* — Rothwell, Figg, Ernst & Manbeck, P.C.

(57) ABSTRACT

In one aspect, a method and apparatus are disclosed that can provide an efficient and robust HSDPA flow control solution. The RNC (110) can receive information regarding allowed data rate from the Node-B (120) for a data flow in a downlink direction. Based on the received data rate information and optionally based on other predetermined considerations, the RNC (110) adjusts the RLC PDU transmission window size for the data flow. When the RLC PDU transmission window is properly sized, reaction to congestion can be performed quicker relative to the existing Iub flow control.

18 Claims, 12 Drawing Sheets

LIMITING RLC WINDOW SIZE IN THE HSDPA FLOW CONTROL

CROSS-REFERENCE TO RELATED APPLICATIONS

This application is a 35 U.S.C. §371 National Phase Application from PCT/SE2008/051223, filed Oct. 29, 2008, and designating the United States, and claims priority to Provisional Application No. 60/984,449, filed Nov. 1, 2007. The above-mentioned applications are incorporated by reference herein.

TECHNICAL FIELD

The disclosed technology relates to apparatuses and methods to enable efficient and robust implementation of flow control in wireless networks.

BACKGROUND

As the demand grows for higher throughput, i.e., higher bit rate, and more efficient transmission of packet data over wireless networks, the 3rd Generation Partnership Project (3GPP) has extended its specifications with the High Speed Downlink Packet Access (HSDPA). In HSDPA, a new shared downlink transport channel, called High-Speed Downlink Shared Channel (HS-DSCH), is introduced. This channel is dynamically shared the among packet data users, primarily in the time domain. The application of shared channel makes the use of available radio resources more efficient. The HSDPA also supports new features that rely on the rapid adaptation of transmission parameters to instantaneous radio conditions, also referred to as the Adaptive Modulation and Coding (AMC). The main features of the HSDPA include fast link adaptation, fast Hybrid-ARQ (HARQ—Automatic Repeat Request), and fast channel-dependent scheduling Prior to the advent of the HSDPA, transport channels were terminated at the radio network controller (RNC) in wireless networks such as Release '99 networks. This meant that functionalities such as retransmission of packet data, to serve ARQ for example, was located in the RNC. With the advent of the HSDPA, wireless networks such as UMTS (Universal Mobile Telephone System) Terrestrial Radio Access Network (UTRAN), the control of radio frame scheduling is moved from the RNC to the Node-B, i.e., to the base station. In this manner, transmissions and retransmissions of packet data can be directly controlled by the Node-B, which leads to faster retransmissions. This in turn leads to shorter delays and better throughput.

FIG. 1 illustrates an example UTRAN system 100. The system 100 includes an RNC 110 communicating with the core network (not illustrated) over an Iu interface. The system also includes multiple radio base stations also known as Node-Bs 120 connected to the RNC 110 over an Iub interface. The user equipments (UE) 130, typically mobile terminals, communicate with one or more Node-Bs 120 over a Uu interface (radio link). The Iub interface between the Node-B 120 and the RNC 110 has a flow control (FC) mechanism to ensure that the buffers in the Node-B 120 are used properly and to prevent data loss due to buffer overflow.

In UTRAN, fixed capacity (e.g. 64 kbps) can be reserved for traditional Dedicated Channel (DCH) traffic in the access network. However, for HSDPA, per flow bandwidth reservation is not efficient since the Uu interface throughput is much higher and fluctuates more. If the bandwidth reservation is not used, then congestion can occur both in the Iub transport network (TN) between the RNC and the Node-B and also in the Uu interface between the Node-B and the UE. In the current architecture, TCP cannot efficiently resolve a congestion situation in the access network, because lower layer retransmissions hide the congestion situations from the TCP. Thus, a flow control function is introduced to control the data transfer between the RNC and Node-B in HSDPA.

Originally, the flow control (FC) was designed to take only the transmission capabilities of the Uu interface into account and to limit the latency of layer 2 signalling. However, the increased Uu interface capacity did not always coincide with similarly increased Iub TN capacity in practice. The cost of Iub transport links is still high and is not expected to decrease dramatically. It is a common scenario that the throughput is limited by the capacity available on the Iub TN links and not by the capacity of the Uu interface. On these high cost TN links, it is important to maintain high efficiency.

The protocol layers and the nodes involved in the HSDPA are illustrated in FIG. 2. The HSDPA FC is located in the Node-B. The task of the FC is to regulate the transfer of Medium Access Control-d Protocol Data Units (MAC-d PDUs) from the RNC to the Node-B. More precisely, the FC regulates the transfer of data from the Radio Link Control (RLC) buffer in RNC to the MAC-hs buffer in Node-B.

There are at least two types of bottlenecks—the Iub TN and the air interface (Uu) bottlenecks. Typically, the Iub TN bottleneck is a single link between RNC and Node-B, where all flows of the same Node-B share the same TN bottleneck buffer and TN capacity. These flows can utilize the remaining TN capacity from high priority traffic (e.g. DCH). Each flow belonging to the same cell shares Uu resources, but each flow has a dedicated priority queue (PQ) in the Node-B in the form of MAC-hs buffers. A Node-B can include one or more cells. The FC is responsible for efficient use of these changing TN and Uu bottlenecks. It is desirable to maintain high end-user throughput while also maintaining low end-to-end delay for delay sensitive applications such as gaming. The delay target for MAC-d PDUs is typically smaller than 100 ms.

The HSDPA FC is used to avoid or limit Iub TN and Uu congestions. In the Node-B, the flow control function calculates the bit rate of the HSDPA flow and the calculated bit rate is sent to the RNC using the standardized CAPACITY ALLOCATION (CA) control frame. In the RNC, the HSDPA is shaped with this bit rate. Practically, if there is some congestion in the Iub TN or in the Uu part, the flow control function reduces the bit rate of HSDPA flow to resolve the congestion.

SUMMARY

In an aspect, a method to operate an RNC is disclosed that can provide an efficient and robust HSDPA flow control solution. The RNC can receive information regarding allowed data rate from the Node-B for a data flow in the downlink direction. Based on the received data rate information and optionally based on other predetermined considerations, the RNC adjusts the RLC transmission window size for transferring RLC PDUs for the data flow. When the RLC transmission window is properly sized, reaction to congestion can be performed quicker relative to the existing Iub flow control.

In an embodiment, the RNC receives the allowed data rate information from the Node-B, for example, in a form of an HS-DSCH Capacity Allocation (CA) control frame. Based on the information contained in the CA frame, the allowed data rate is calculated and the RLC transmission window size is determined and updated. The data rate can be expressed in bit rates or other types of rate measurements.

Preferably, the RLC transmission window size is set to be able to hold an amount of data that can substantially be transferred within a round trip time of the Iub TN between the RNC and the Node-B based on the data rate for the flow. The round trip time can be a predetermined RTT target, twice a predetermined one-way target delay, actual RTT, or twice an actual one-way delay.

In another embodiment, in addition to the data rate, other considerations such as whether or not there is a congestion can also be taken into account when determining the RLC transmission window size. If a congestion condition exists, the RLC transmission window size can be further reduced. The reduction due to a "loss" type of congestion is preferably larger than the reduction due to a "delay" type of congestion.

In yet another embodiment, the RLC transmission window size is set in the RNC without modifying the RLC unit implementing the RLC functionality according to the existing 3GPP standard. A separate entity can send an RLC STATUS PDU with the transmission window size specified therein to the RLC unit. The separate entity may either generate a new RLC STATUS PDU or may adjust an incoming RLC STATUS PDU destined for the RLC entity.

The advantages include at least the following. The proposed embodiment(s) can be implemented in the existing RLC protocol architecture. Also, other nodes such as the Node-B and the UE can remain unchanged. Further, the proposed embodiment(s) enable the wireless network system to react more efficiently and robustly when the bottleneck situations occur.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
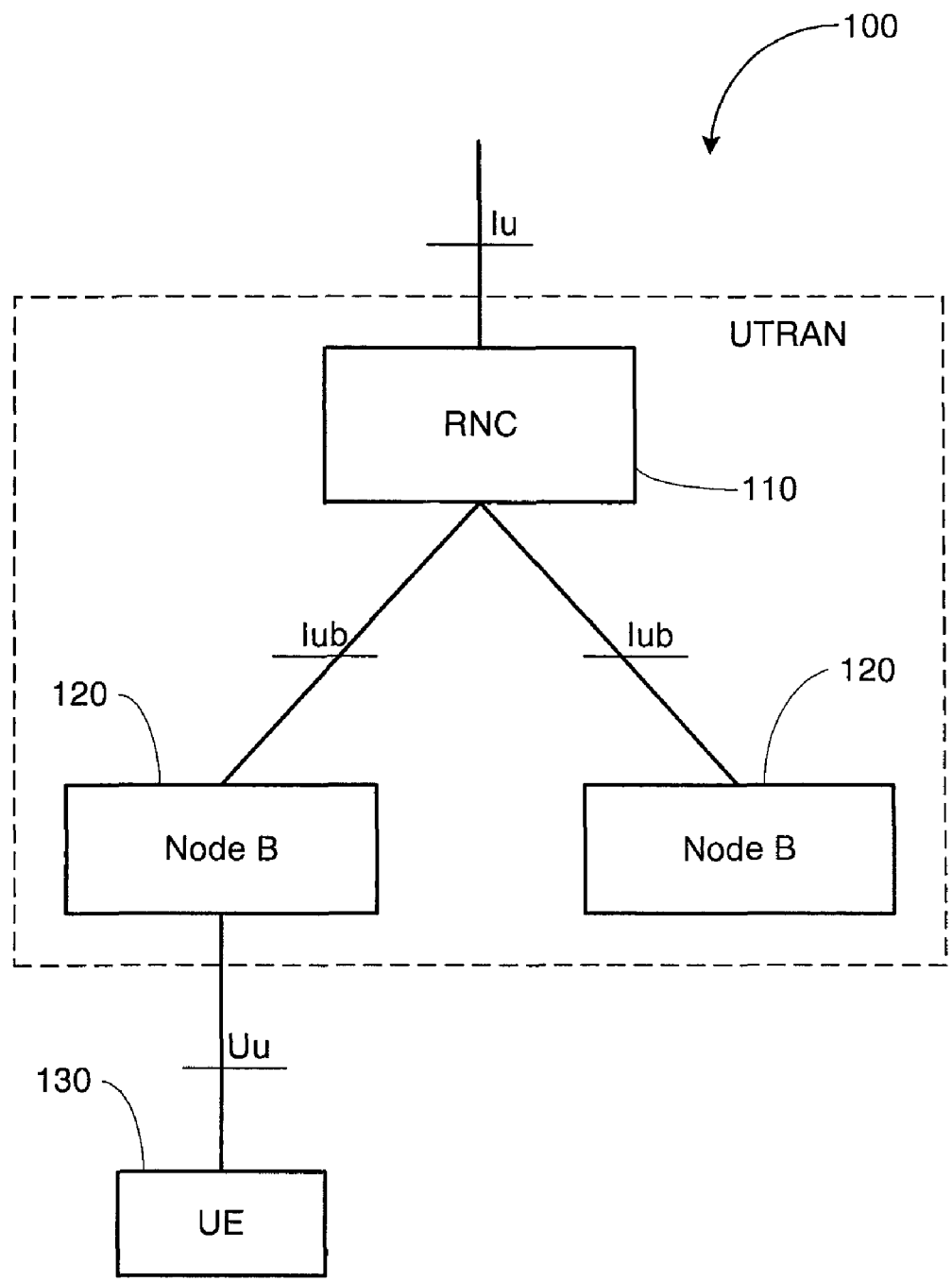
FIG. 1 illustrates an example wireless network system.
Figure 2:
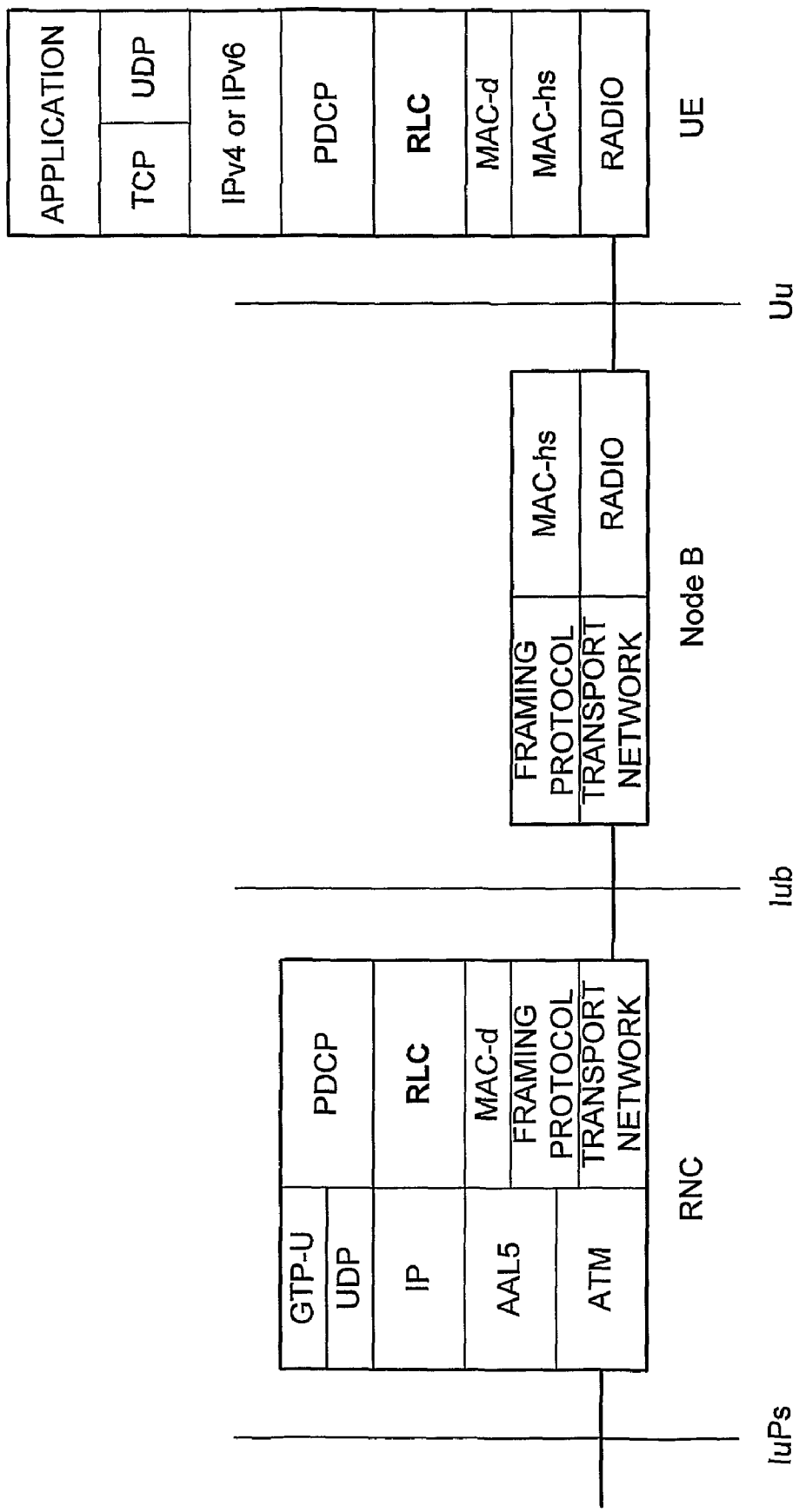
FIG. 2 illustrates protocol layers and the nodes involved in HSDPA.

In the HSDPA architecture illustrated in FIG. 2, the RLC layer in the RNC generates RLC PDUs to be sent to the peer RLC entity in the UE. The RLC layer provides the RLC PDUs to the MAC layer. The MAC layer is split between the RNC and the Node-B. MAC PDUs generated by the RNC (associated with the RLC PDUs), called MAC-d PDUs, are aggregated and sent to the Node-B over the Iub interface in HS-DSCH Data Frames. The Node-B buffers the MAC-d PDUs in the associated priority queues (PQ), i.e., in the MAC-hs buffer, until they are scheduled and successfully transmitted over the Uu interface to the UE. The delivery of the MAC-d PDUs over the Iub is managed by the Iub FC. In an aspect, data flow (or simply flow) can be viewed as the flow of the RLC PDUs, which are associated with the MAC-d PDUs, from the RLC layer between the RNC and the UE via the Node-B. From another perspective, the flows can be viewed as the flows of the MAC-d PDUs associated with the RLC PDUs.

The Iub FC related data frames and control frames are standardized in 3GPP. HS-DSCH Iub data frames contain the user data and transmit information about the amount of user data waiting in the RNC, called User Buffer Size (UBS), and contain information for congestion detection, the Frame Sequence Number (FSN) and the Delay Reference Time (DRT).

Based on the UBS, the Uu related information, and the congestion detection information, the Iub FC algorithm in the Node-B decides how many MAC-d PDUs can be transmitted from the RNC for a given flow. The Node-B reports this to the RNC using the HS-DSCH Capacity Allocation (CA) control frame. The CA message can include the following parameters:

HS-DSCH Credits—the number of MAC-d PDUs allocated;
Maximum MAC-d PDU Length—the maximum size of each MAC-d PDU;
HS-DSCH Interval—the time interval over which the data can be sent; and
HS-DSCH Repetition Period—the period over which this allocation is refreshed and repeated.

The MAC-d shaping in the RNC ensures that within a given HS-DSCH Interval, not more than the HS-DSCH Credits PDUs are sent. The HS-DSCH Repetition Period defines how many times the HS-DSCH Interval and the HS-DSCH Credits are repeated. A newly received CA overrides the old one.

As described above, in the existing protocol architecture, the HSDPA FC function calculates the bit rate of the HSDPA flow and the Node-B sends the calculated bit rate to the RNC using the standardized CA control frame. In the RNC, the HSDPA is shaped with this bit rate. That is, when congestion is detected in the Iub TN or in the Uu, the bit rate of the HSDPA flow is reduced to resolve congestion in the existing HSDPA architecture.

Instead of (or in addition to) controlling the bit rate of the HSDPA, in an aspect of the disclosed technology, it is proposed to control the flow rate by using capabilities of the RLC layer. In one aspect, the RLC receives the CA frame from the Node-B for a flow. Based on the information contained within the CA frame, the RNC adjusts the RLC transmission window size for the flow. In this manner, the number of unacknowledged RLC PDUs can be limited.

In the existing HSDPA systems, the RLC transmission window size is set to a maximum value regardless of the actual system condition, and the size RLC transmission window size does not vary. If the Iub TN becomes congested, the existing FC algorithm needs time to react. This can as much as 300 ms, which is significantly longer than the delay target of 100 ms. The bit rate will only be reduced after the flow control reaction time.

However, adjusting the RLC transmission window size allows for much more responsive adaptation. In the RNC, the RLC transmission window size can be limited in one embodiment based on the data rate received from the Node-B for the flow and based on a target delay such as a Iub TN delay. If the real Iub TN delay is less or equal than the target delay, the transmission window size limitation has no effect on the transmission. But if the delay gets larger, the transmission window size limitation automatically reduces the sending rate of the RLC PDUs. Preferably, the RLC transmission window size is set to be substantially equal to the transport network round-trip-time (RTT).

One significant advantage of adjusting the RLC transmission window size over controlling the bit rate is that reaction time is much faster. Practically, the RNC sends new RLC PDUs when acknowledgments of previously sent RLC PDUs arrive from the UE (via through the Node-B). This makes handling of Iub TN congestions more efficient.

Figure 3:
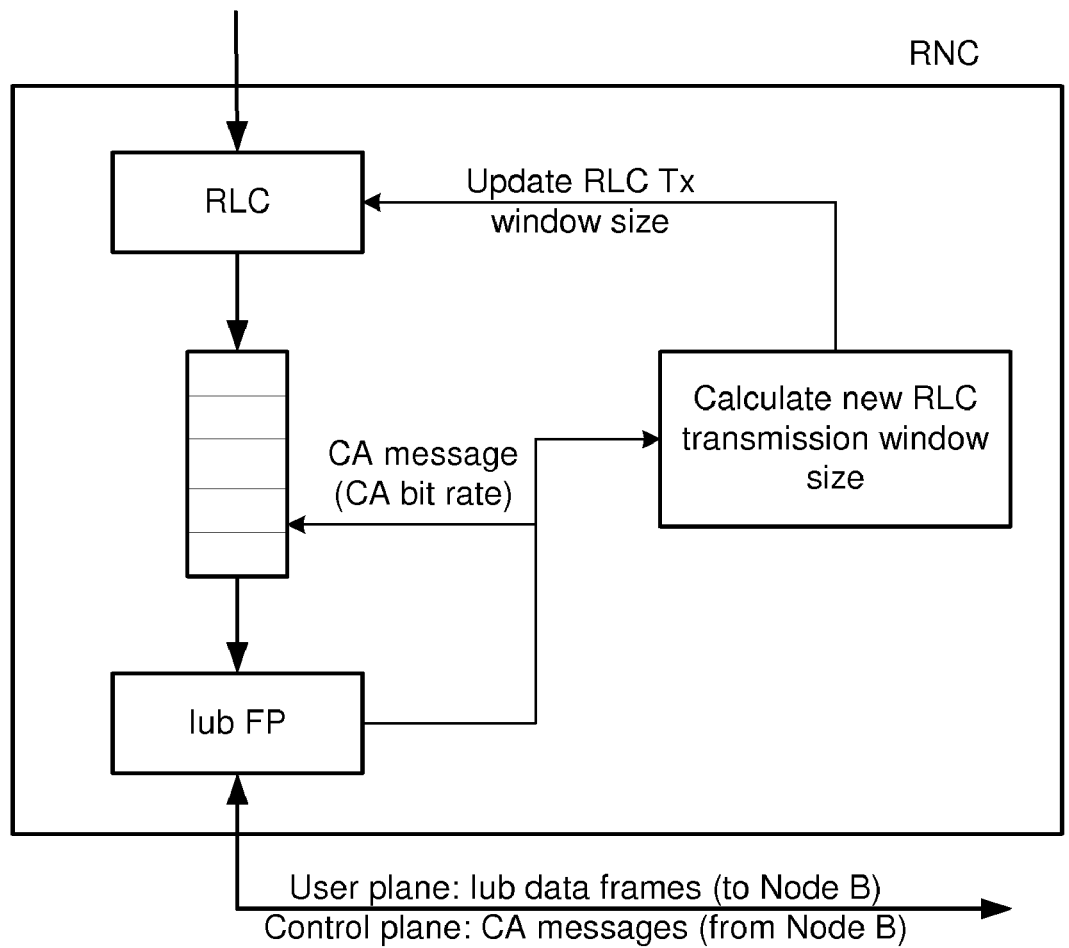
FIG. 3 illustrates an embodiment of an architecture of the RNC that includes an RLC with transmission window size support.

FIG. 3 illustrates an embodiment of an architecture of the RNC that includes the RLC with transmission window size support. For each CA message received, the RNC performs the following:

Extract the shaping rate from the CA (CA data rate).
Calculate a new RLC transmission window size based on the extracted CA data rate and possibly other predetermined contants.
Set the RLC transmission window size.
Continue processing the received CA message according to the original process.

To set the RLC transmission window size in one embodiment, the RLC entity within the RNC is extended with the new functionality. This modification is an internal change within the RNC only. Other nodes such as the Node-B and the UE are not impacted.

Alternatively, the RLC transmission window size can be set without any changes to the RLC functionalities in the RNC as standardized in 3GPP. In this alternative, the RLC transmission window size can be changed through RLC STATUS PDUs. As will be further demonstrated below, a new RLC STATUS PDU can be generated or the size can be overwritten in an arriving RLC STATUS PDU. The RLC STATUS PDU—whether newly generated or overwritten—can be sent to the RLC entity functioning according to the existing 3GPP standard.

Figure 4:
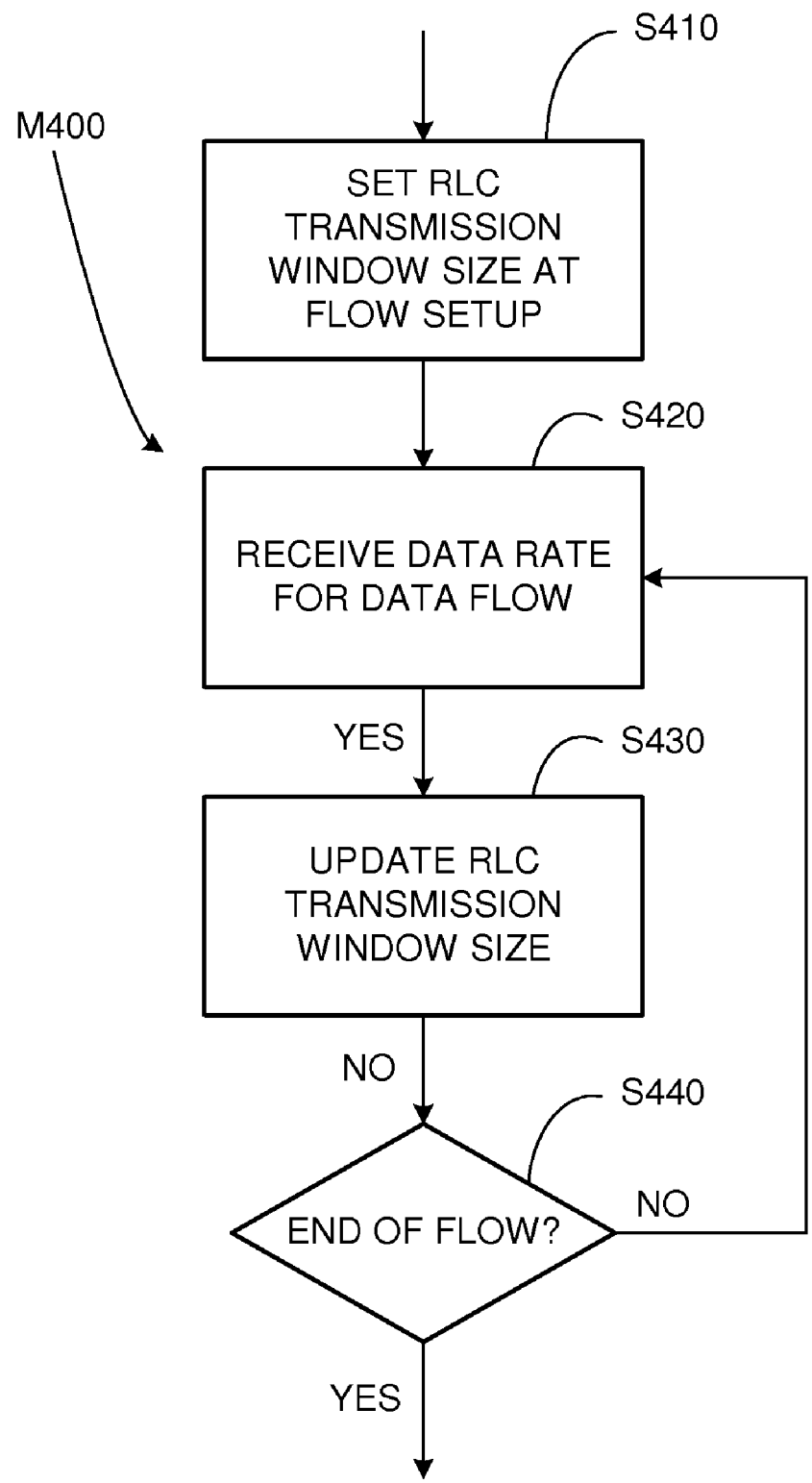
FIG. 4 illustrates an example method to operate the RNC to adapt the RLC transmission window size for a data flow.

FIG. 4 illustrates an example method M400 of operating the RNC to adapt the RLC transmission window size for a data flow. Here, it is assumed that the RNC is exchanging RLC PDUs with the UE through the Node-B. That is, the RNC is in communication with the UE via the Node-B. In the method, at initial flow set up in step S410, the RLC transmission window size is initially set. In one embodiment, an RLC unit that is arranged to implement the RLC functionalities may perform the initial set up and determine the initial RLC transmission window size. In another embodiment, the Node-B itself can make the initial allocation of HS-DSCH Credits when the radio link with the UE is first configured to determine the initial window size. In yet another embodiment, a slow-start phase may be used. For example, for every acknowledged RLC PDU, the size of the RLC transmission window can be increased by one RLC PDU.

In the example method M400, the flow may be viewed as a flow of the RLC PDUs between the RNC and the UE. The RLC transmission window size sets a maximum amount of outstanding data for the data flow that can be transmitted from the RNC to the UE (through the Node-B) until an acknowledgment (ACK) is received from the UE.

Figure 5:
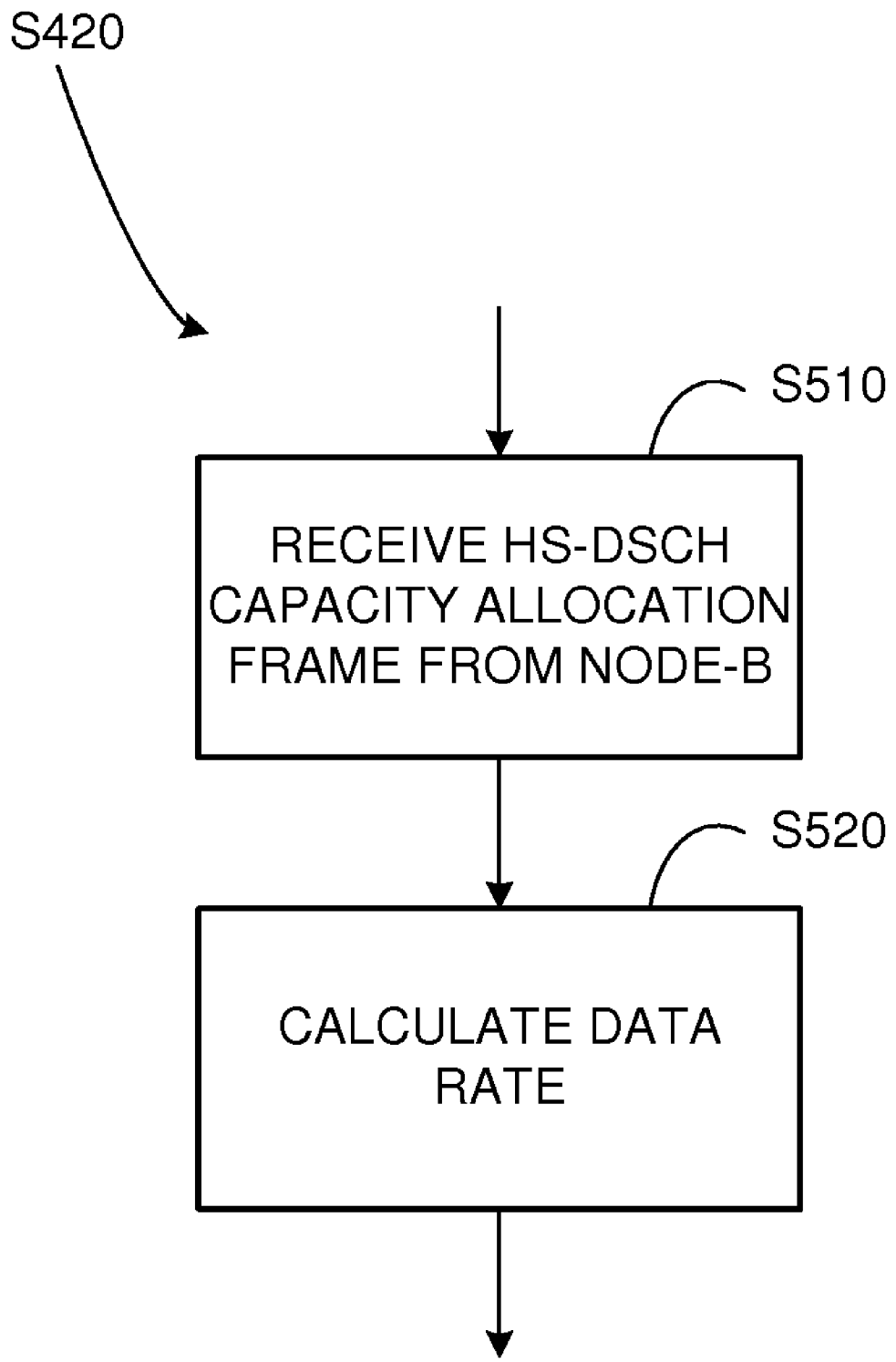
FIG. 5 illustrates an example process to determine the data rate based on information received from the Node-B.

In step S420, the RNC receives a data rate information from the Node-B for the flow. In an embodiment, the data rate information is provided in an HS-DSCH CA frame. FIG. 5 illustrates an example process to perform the step S420. In step S510, the RNC receives the CA frame from the Node-B and the allowed data rate is calculated in step S520. The data rate is calculated based on any one or more of the parameters Maximum MAC-d PDU Length, HS-DSCH Credits, HS-DSCH Interval, and HS-DSCH Repetition Period specified in the CA frame.

Referring back to FIG. 4, in step S430, the RNC updates the RLC transmission window size based on the received data rate. In one embodiment, the RLC transmission window size is set to window size is set such that an amount of data corresponding to the RLC transmission window size is substantially equal to an amount of data that can be transferred within a predetermined target round trip time of a Iub transport network TN between the RNC and the Node-B based on the data rate.

In algebraic terms, the RLC transmission size may be set according to the following formula:

$$WS(Tx) \approx \frac{DR * RTT}{S(RP)} \quad (1)$$

where WS(Tx) is the RLC transmission window size, DR is the data rate, RTT is a predetermined target Iub TN round trip time, and S(RP) is a size of one RLC PDU. The size S(RP) may be expressed in any number of ways including number of bytes or octets.

In another embodiment, the target RTT is simply assumed to be twice a one-way delay on the Iub TN. In this instance, the RLC transmission size may be set according to the following formula:

$$WS(Tx) \approx \frac{2 * DR * DT}{S(RP)} \quad (2)$$

wherein DT is a predetermined target one-way Iub TN delay time.

Figure 6:
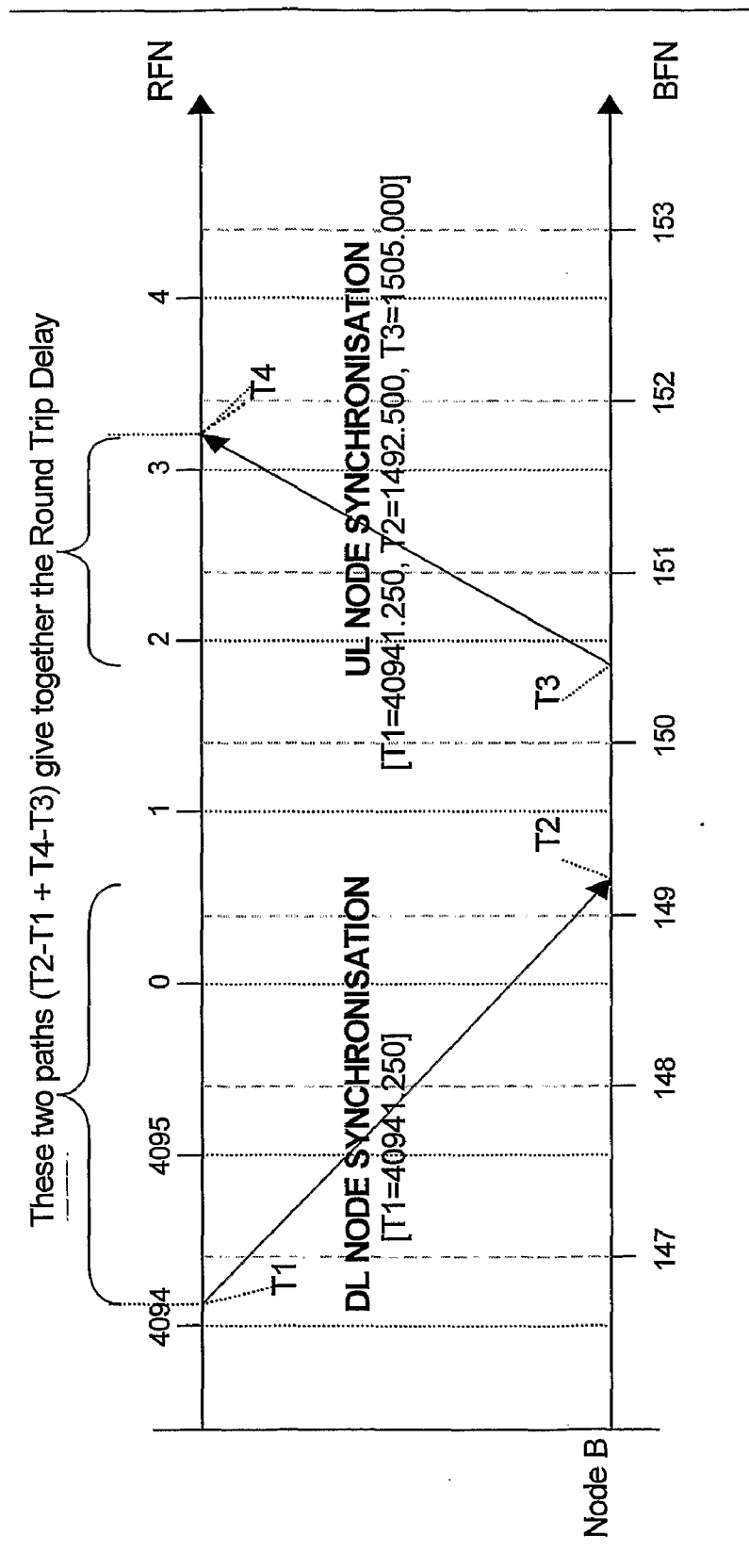
FIG. 6 illustrates a visualization of a synchronization procedure used between the RNC and the Node-B.

In yet another embodiment, actual delays may be utilized instead of the targeted delays. FIG. 6 illustrates is a visualization of a synchronization procedure used between the RNC and the Node-B as described in 3GPP TS 25.402. As illustrated, the RNC sends a DL-NODE SYNCHRONIZATION message to the Node-B with the time T1 indicating when the message is sent. The message from the RNC arrives to the Node-B at time T2. In response, the Node-B sends a UL-NODE SYNCHRONIZATION message to the RNC with the time T3 indicating when the message sent. The message also includes the time T2. The message from the Node-B arrives to the RNC at time T4. RNC can calculate the actual RTT as (T2−T1)+(T4−T3).

Figure 7A:
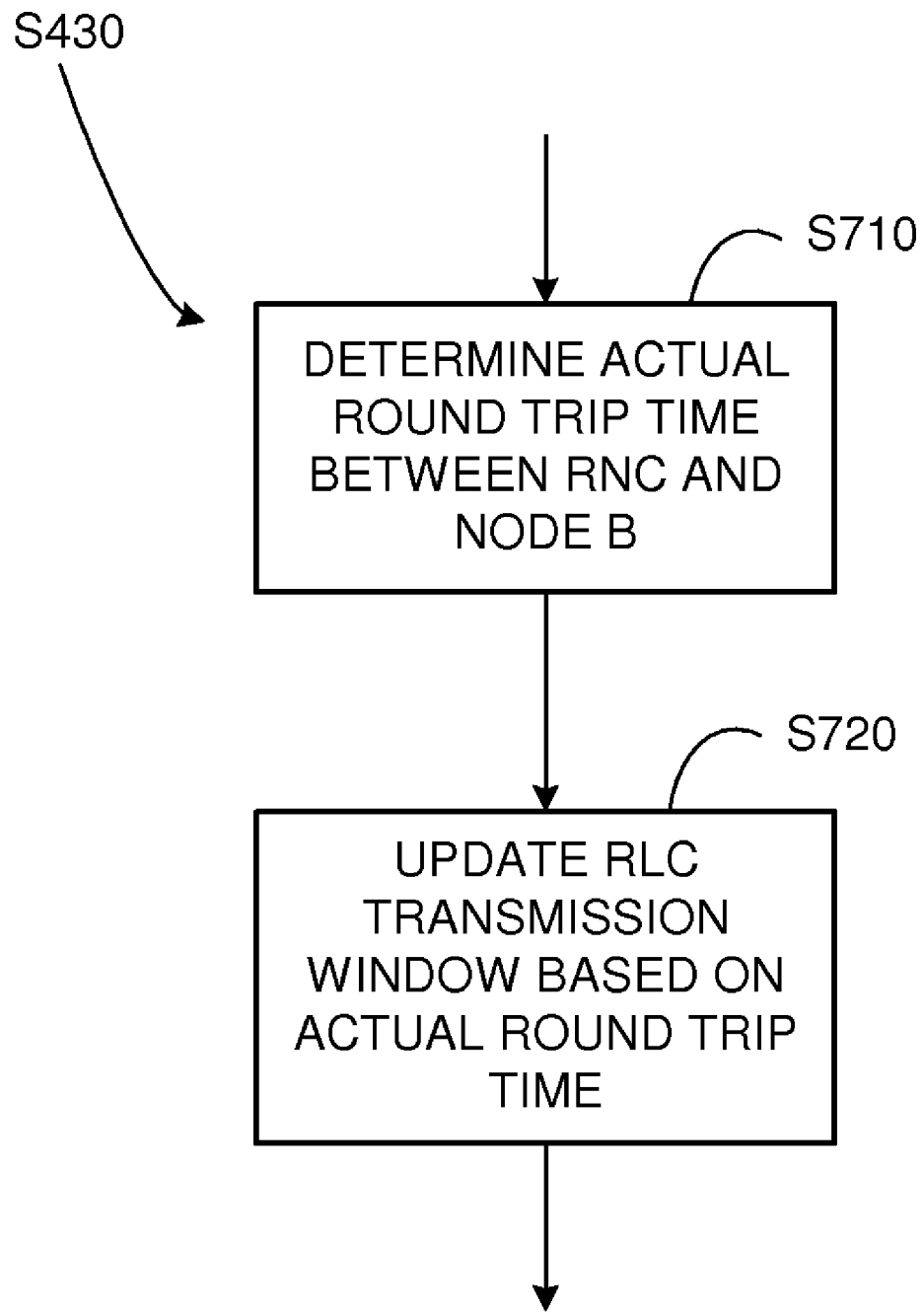
FIG. 7A illustrates another example process to update the RLC transmission window size.

FIG. 7A illustrates an example process to perform the step S430. In step S710, the RNC determines the actual round trip time. As a example, the above illustrated synchronization procedure can be used for this purpose. In step S720, the RLC transmission window size is updated based on the actual RTT and the data rate. In algebraic terms, the following formula may be applied:

$$WS(Tx) \approx \frac{DR * RTT(A)}{S(RP)} \quad (3)$$

where RTT(A) is the actual Iub TN round trip time. In this embodiment, the RLC transmission window size is set such that an amount of data corresponding to the RLC transmission window size is substantially equal to an amount of data that can be transferred within the actual round trip time of the Iub TN based on the data rate.

Figure 7B:
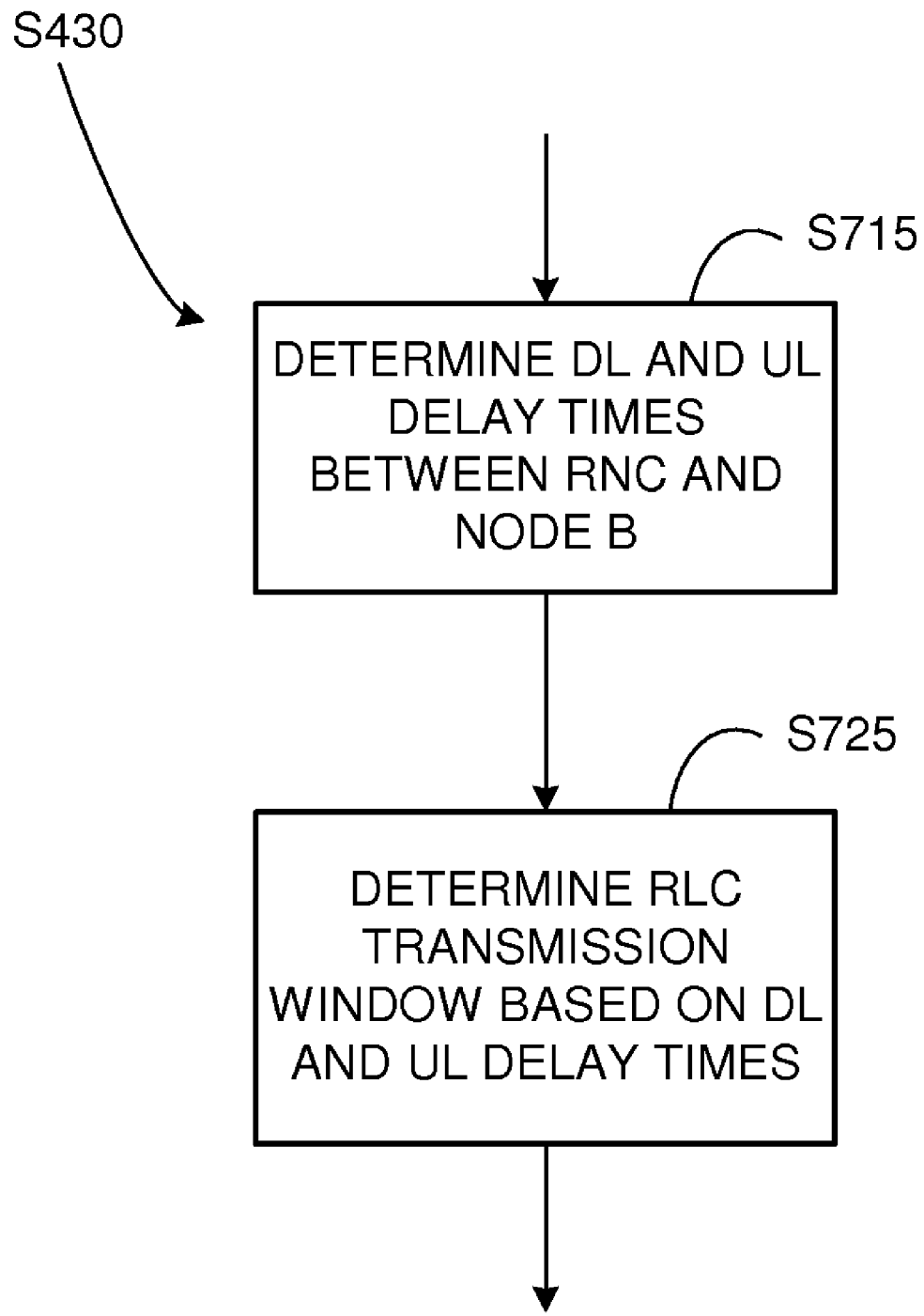
FIG. 7B illustrates yet another example process to update the RLC transmission window size.

In another embodiment, one of the times (T2−T1) and (T4−T3) may be used as illustrated in FIG. 7B which shows an example process to perform the step S430. In step S715, the actual downlink (T2−T1) and uplink (T4−73) delay times are determined. In step S725, the RLC transmission window size is updated based on the actual DL or UL delay time and the data rate. In algebraic terms, the following formula can be applied:

$$WS(Tx) \approx \frac{2 * DR * DT(A)}{S(RP)} \quad (4)$$

wherein DT(A) is one of the one-way Iub TN delay times (T2−T1) and (T4−T3). Preferably, the longer of the times (T2−T1) and (T4−T3) is used to be conservative. In this embodiment, the RLC transmission size is set such that an amount of data corresponding to the RLC transmission window size is substantially equal to an amount of data that can be transferred within twice the actual uplink or the downlink delay times, which ever is greater.

Figure 8:
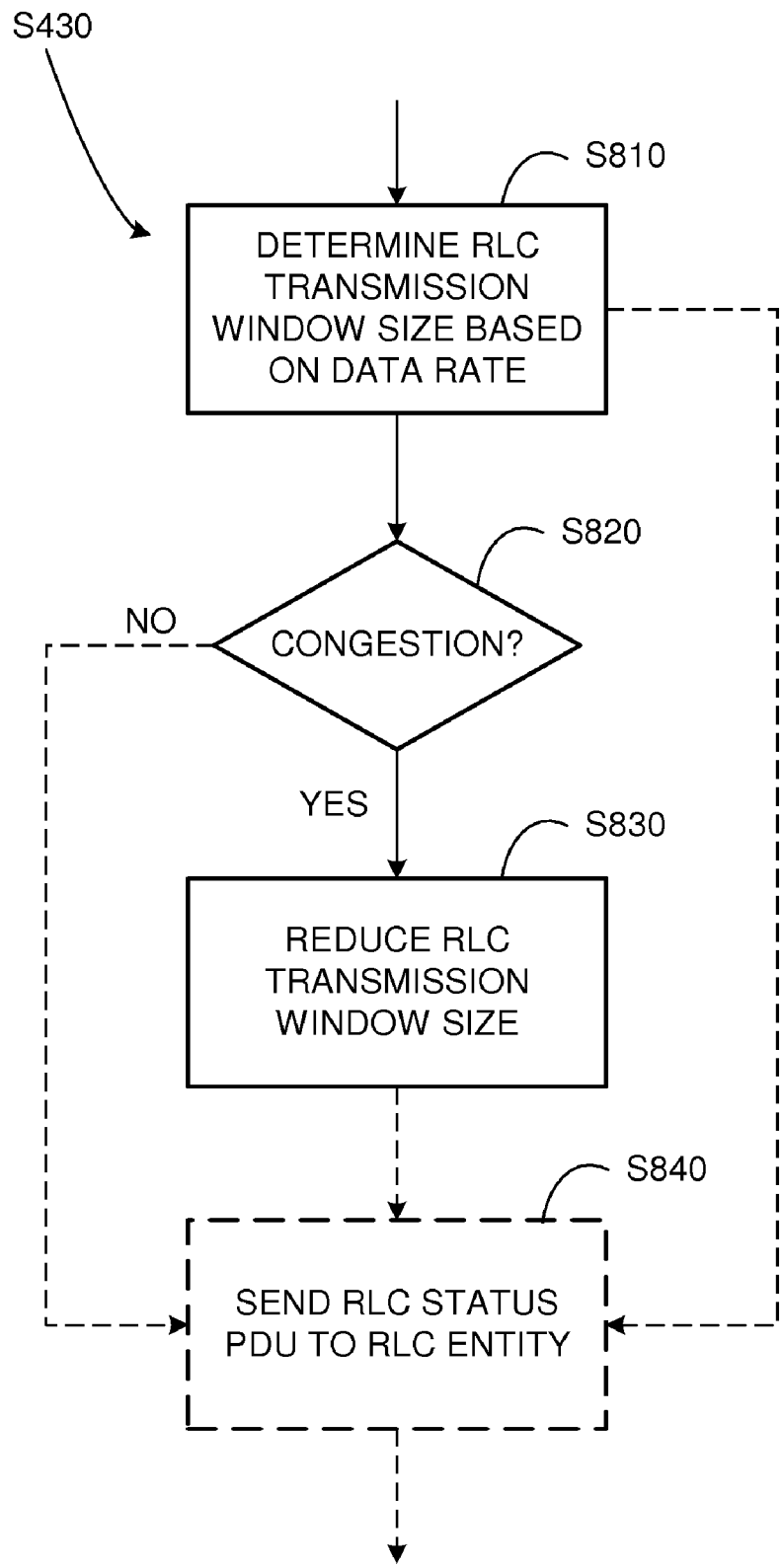
FIG. 8 illustrates an example process to update the RLC transmission window size.

Referring back to FIG. 4, when updating the RLC transmission window size, there can be factors other than the data rate and delays on the Iub TN. FIG. 8 illustrates an example process to perform the step S430 in consideration of these other factors. In step S810, an appropriate RLC transmission window size is determined based on the data rate. Note that any one or more of the formulas (1), (2), (3), and (4) may be used for this purpose.

In step S820, the RNC determines whether there is congestion in the Iub TN. In one embodiment, the HS-DSCH CA frame received from the Node-B is used for this purpose. The CA frame can include a two bit Congestion Status parameter according to the existing 3GPP standard indicating whether or not there a congestion condition exists in the downlink direction (from the RNC to the Node-B) for the flow. There are two types—"loss" or "delay". Loss indicates that actual data frames have been lost, which requires retransmission. Delay indicates that the PDU packets for the flow have accumulated beyond a predetermined threshold level in the Node-B.

When congestion is detected, it may be desirable to further reduce the RLC transmission window size. This is reflected in step S830 in which the RLC transmission window size is reduced when the congestion is detected. The amount of reduction can vary depending on the congestion type. As an example, if the congestion indicates that there are losses in the frames, then the amount of reduction would be more severe then if the congestion indicates that there is a delay.

In the methods described above, the RLC entity may update the RLC transmission window size. This can be considered as a deviation from the existing 3GPP standard. However, the RLC transmission window size update can be accomplished without deviating from the 3GPP standard. The standard indicates that the receiver of the RLC PDUs (either the UE or the RNC) can set the RLC transmission window size of the sender (the RNC or the UE) by sending an RLC STATUS PDU to the receiver with the desired transmission window size indicated in the RLC STATUS PDU. The sender, upon receiving the RLC STATUS PDU, adjusts the window size accordingly.

Thus, in one embodiment, the RLC unit within the RNC performs the RLC functions conforming to the standard. In this embodiment, another entity that is separate from the RLC unit, is used. Note that "separate" only indicates a separate function be provided. While completely separate hardware can be provided, similar results can be achieved through software and/or firmware.

Referring back to FIG. 8, after the RLC transmission window size is determined in the step S810 or in the step 830, an RLC STATUS PDU message with the determined window size is sent to the RLC unit implementing the standard RLC functionalities in step S840. In an embodiment, the RLC STATUS PDU is made to appear as if it is from the receiver of the flow of the RLC PDUs, i.e., the corresponding UE. The box for step S840 is dashed to indicate this is an alternative. In this embodiment, the separate entity (preferably within the RNC) sends the RLC STATUS PDU to the RLC unit.

Figure 9A:
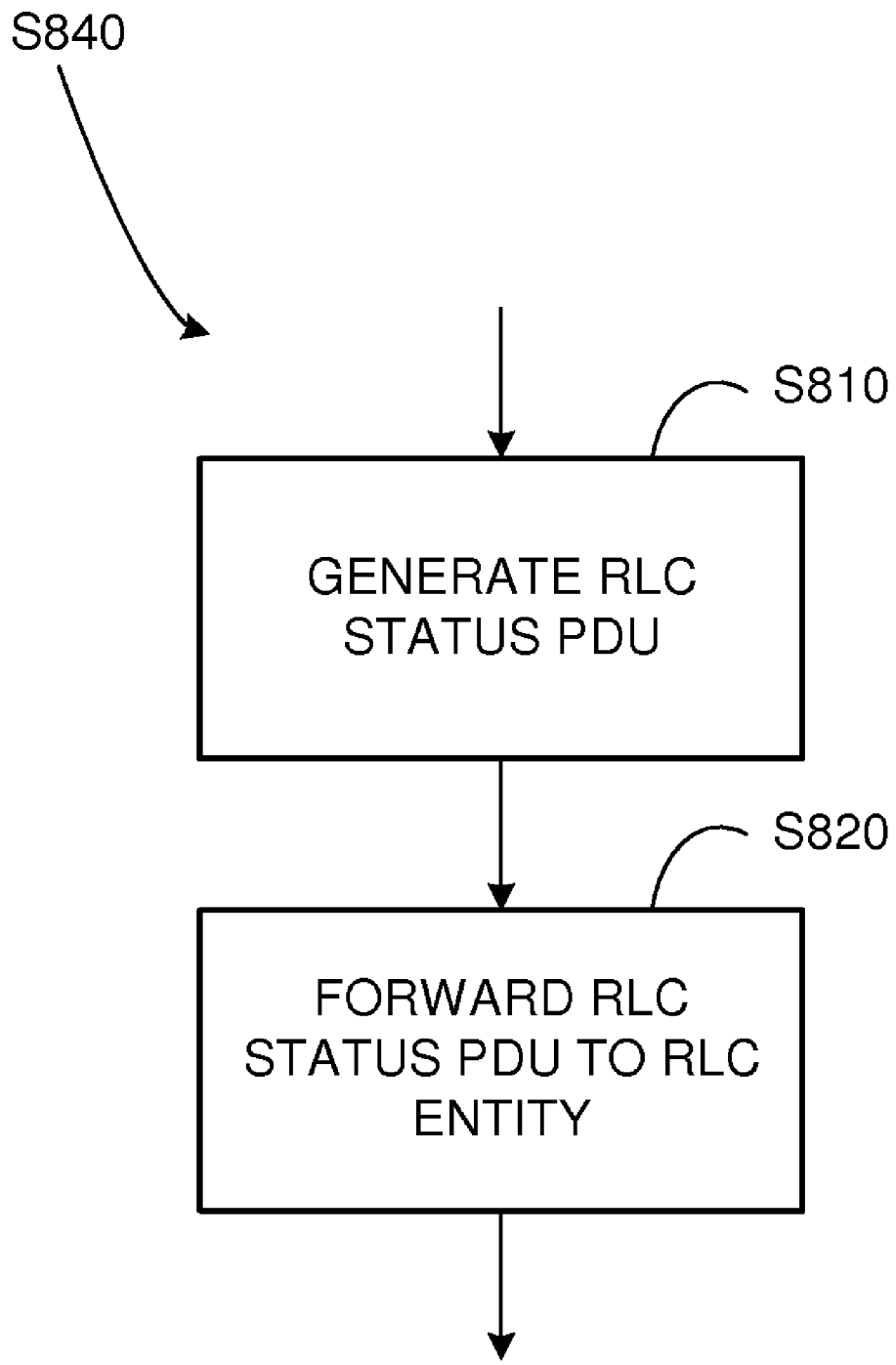
FIG. 9A illustrates an example process to send an RLC STATUS PDU to an RLC entity within the RNC.

FIG. 9A illustrates an example process to implement the step S840. In this instance, an entirely new RLC STATUS PDU with the RLC transmission window size is generated in step S910, and the generated RLC STATUS PDU is sent to the RLC unit in step S920.

Figure 9B:
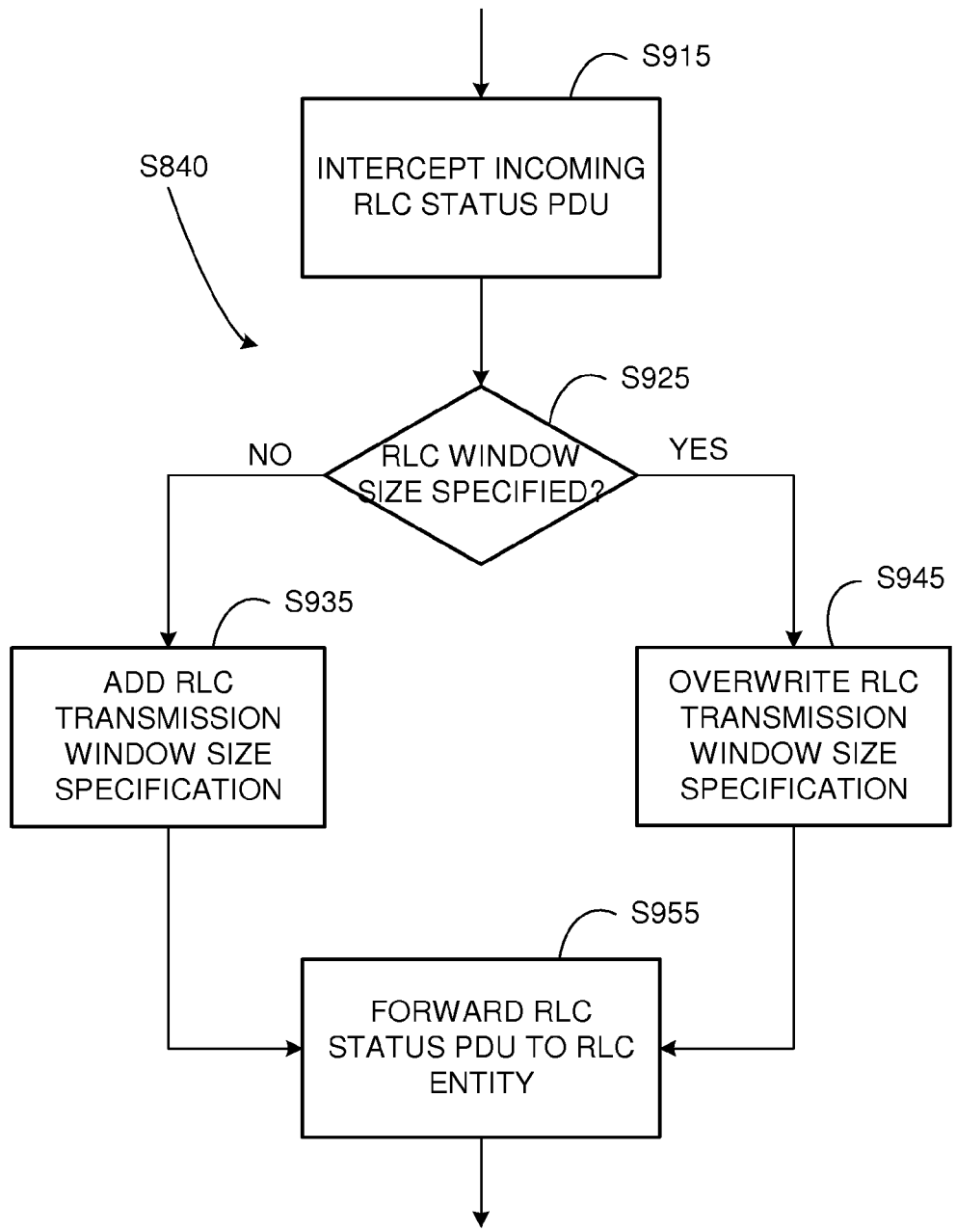
FIG. 9B illustrates another example process to send the RLC STATUS PDU to the RLC entity within the RNC.

However, there may be instances where the actual receiver of the RLC PDUs, i.e., the UE, sends the RLC STATUS PDU destined for the RNC. FIG. 9B illustrates an example process to implement the step S840 in such situations. In step S915, the incoming RLC STATUS PDU is intercepted, and in step S925, it is determined whether or not the RLC transmission window size for the flow is specified. If the window size is not specified, then the window size specification can be added to the RLC STATUS PDU in step S935. If the window size is specified in the RLC STATUS PDU from the UE, then the window size specification can be overwritten with the RLC transmission window size determined in the step S810 or S830. In an embodiment, the RLC transmission window size is overwritten only if determined size is less than the size already specified in the RLC STATUS PDU. Then in step S755, the RLC STATUS PDU is forwarded to the RLC unit.

Figure 10:
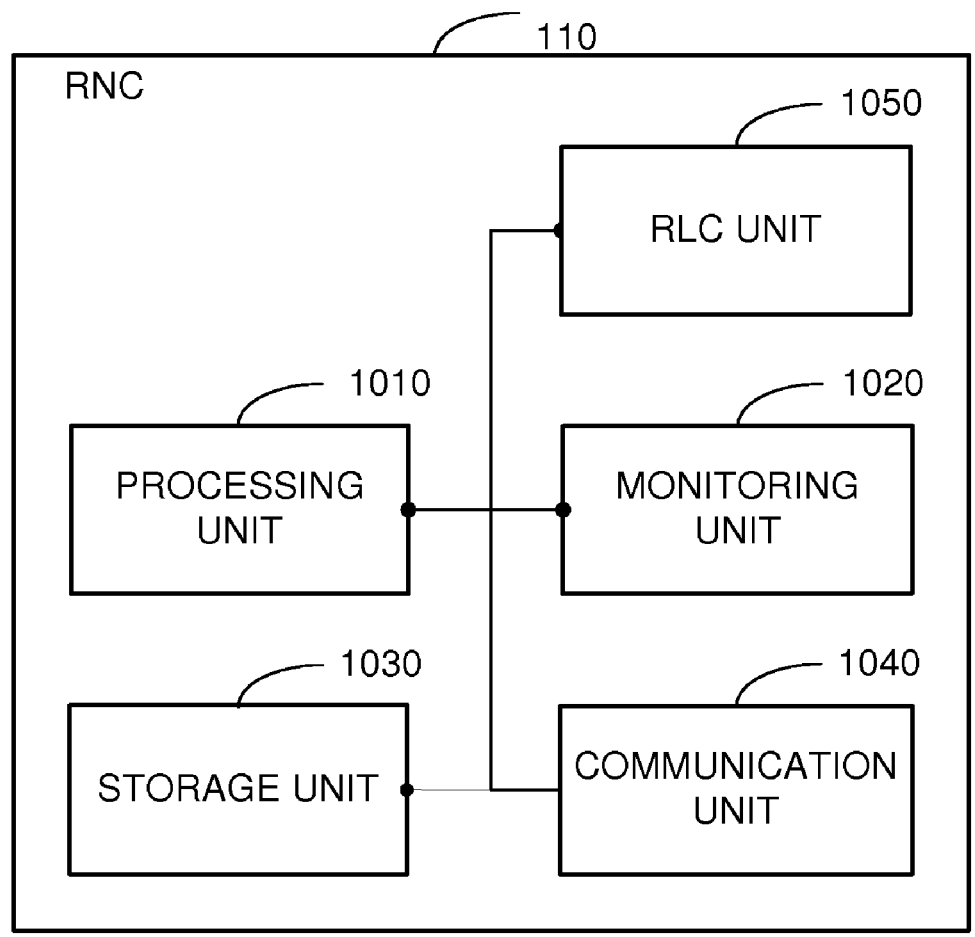
FIG. 10 illustrates an embodiment of the RNC.

FIG. 10 illustrates an example embodiment of the RNC arranged to implement the methods described above. The RNC includes a processing unit 1010, a monitoring unit 1020, a storage unit 1030, a communication unit 1040, and an RLC unit 1050. The processing unit 1010 is arranged to control the overall operations of the RNC including coordinating and controlling the other units 1020-1050 to perform the methods.

The monitoring unit 1020 is arranged to monitor statuses of the RNC including monitoring the data traffic conditions on communication links between the RNC and the Node-B such as the Iub TN. The storage unit 1030 is arranged to store information necessary for proper functioning of the RNC 110 including storing data and control information for the data flow between the RNC and the UE. The storage unit 1030 can be used to buffer the RLC PDUs, MAC PDUs, etc. to implement the protocol architecture. The communication unit 1040 is arranged to communicate with the UE through the Node-B including exchanging RLC PDUs, packaged in corresponding MAC-d PDUs. The communication with the Node-B can occur over the Iub TN.

The RNC can also include a RLC unit 1050 arranged to perform the RLC procedures according to the 3GPP standard. In this instance, the processing unit 1010 can determine the RLC transmission window size and send the RLC STATUS PDU with the transmission size specified therein to the RLC unit 1050 as described above.

The units 1010-1050 are illustrated as separate units in FIG. 10. However, this is merely to indicate that the functionalities are separated. The units can be provided as separate hardware devices. However, other configurations are possible. Any combination of the units can be implemented in any combination of software, hardware, and/or firmware.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for operating a radio network controller (RNC) in a wireless network, the RNC being in communication with a user equipment (UE) via a Node-B, the method comprising:
    setting a radio link control (RLC) transmission window size for a data flow associated with the UE at initial flow set up;
    receiving a data rate from the Node-B for the data flow; and
    updating the RLC transmission window size for the data flow based on the received data rate, wherein
    the data flow is a flow of RLC protocol data units (PDUs) between the RNC and the UE, and
    the RLC transmission window size sets a maximum amount of outstanding data for the data flow that can be transmitted from the RNC to the UE until an acknowledgment (ACK) is received from the UE.

2. The method of claim 1, wherein the step of receiving the data rate comprises:
    receiving a HS-DSCH CAPACITY ALLOCATION control frame for the data flow from the Node-B over an Iub transport network (TN); and
    calculating the data rate based on any one or more parameters Maximum MAC-d PDU Length, HS-DSCH Credits, HS-DSCH Interval, and HS-DSCH Repetition Period specified in the received HS-DSCH CAPACITY ALLOCATION control frame.

3. The method of claim 2, wherein the step of updating the RLC transmission window size comprises:
    determining the RLC transmission window size based on the calculated data rate; and
    reducing the RLC transmission window size further by a predetermined amount when a Congestion Status parameter of the received HS-DSCH CAPACITY ALLOCATION control frame indicates that a congestion exists in the Iub TN in a downlink direction from the RNC to the Node-B.

4. The method of claim 2, wherein the step of updating the RLC transmission window size comprises:
    determining the RLC transmission window size based on the calculated data rate; and
    sending a RLC STATUS PDU specifying the RLC transmission window size therein to a RLC entity within the RNC,
    wherein the RLC entity is arranged to perform RLC procedures according to the 3GPP standard.

5. The method of claim 4, wherein the step of sending the RLC STATUS PDU comprises:
    intercepting an incoming RLC STATUS PDU for the data flow;
    adding a RLC transmission window size specification to the incoming RLC STATUS PDU when the incoming RLC STATUS PDU does not include the RLC transmission window size specification;
    overwriting the RLC transmission window size specification when the incoming RLC STATUS PDU includes the RLC transmission window size specification; and
    forwarding the modified incoming RLC STATUS PDU to the RLC entity.

6. The method of claim 1, wherein in the step of updating the RLC transmission window size, the RLC transmission window size is set such that an amount of data corresponding to the RLC transmission window size is substantially equal to an amount of data that can be transferred within a predetermined target round trip time of a Iub transport network (TN) between the RNC and the Node-B based on the data rate.

7. The method of claim 6, wherein in the step of updating the RLC transmission window size, the RLC transmission window size is set according to:

$$WS(Tx) \approx \frac{DR * RTT}{S(RP)}$$

wherein WS(Tx) is the RLC transmission window size, DR is the data rate, RTT is the predetermined target Iub TN round trip time, and S(RP) is a size of one RLC PDU.

8. The method of claim 6, wherein in the step of updating the RLC transmission window size, the RLC transmission window size is set according to:

$$WS(Tx) \approx \frac{2 * DR * DT}{S(RP)}$$

wherein WS(Tx) is the RLC transmission window size, DR is the data rate, DT is a predetermined target one-way Iub TN delay time, and S(RP) is a size of one RLC PDU.

9. The method of claim 1, wherein the step of updating the RLC transmission window size comprises:
   determining an actual round trip time of an Iub TN between the RNC and the Node-B; and
   updating the RLC transmission window size based on the actual round trip time,
   wherein the RLC transmission window size is such that an amount of data corresponding to the RLC transmission window size is substantially equal to an amount of data that can be transferred within the actual round trip time of the Iub TN based on the data rate.

10. The method of claim 1, wherein the step of updating the RLC transmission window size comprises:
   determining an actual uplink and downlink delays of an Iub TN between the RNC and the Node-B; and
   updating the RLC transmission window size based on the actual uplink and downlink delays,
   wherein the RLC transmission window size is such that an amount of data corresponding to the RLC transmission window size is substantially equal to an amount of data that can be transferred within twice the actual uplink or the downlink delay, which ever is greater.

11. A radio network controller (RNC) in a wireless network, comprising:
   a communication unit arranged to exchange RLC PDUs with a UE via a Node-B over an Iub TN;
   a monitoring unit arranged to monitor data traffic conditions on communication links between the RNC and the UE and on communication links between the RNC and the Node-B;
   a storage unit arranged to store data and control information for a data between the RNC and the UE; and
   a processing unit arranged to control the communication unit, the monitoring unit, and the storage unit to perform communication operations for the RNC, wherein the processing unit is arranged to:
      set a RLC transmission window size for a data flow associated with the UE at initial flow set up;
      receive, via the communication unit, a data rate from the Node-B for the data flow; and
      update the RLC transmission window size for the data flow based on the received data rate,
   the data flow is a flow of RLC PDUs between the RNC and the UE, and
   the RLC transmission window size sets a maximum amount of outstanding data for the data flow that can be transmitted from the RNC to the UE until an acknowledgment (ACK) is received from the UE.

12. The RNC of claim 11, wherein the processing unit is arranged to receive the data rate by:
   receiving a HS-DSCH CAPACITY ALLOCATION control frame for the data flow from the Node-B over an Iub transport network (TN); and
   calculating the data rate based on any one or more parameters Maximum MAC-d PDU Length, HS-DSCH Credits, HS-DSCH Interval, and HS-DSCH Repetition Period specified in the received HS-DSCH CAPACITY ALLOCATION control frame.

13. The RNC of claim 12, wherein the processing unit is arranged to update the RLC transmission window size by:
   determining the RLC transmission window size based on the calculated data rate; and
   reducing the RLC transmission window size further by a predetermined amount when a Congestion Status parameter of the received HS-DSCH CAPACITY ALLOCATION control frame indicates that a congestion exists in the IuB TN in a downlink direction from the RNC to the Node-B, wherein
   the predetermined amount is a first amount or a second amount when the Congestion Status parameter indicates a delay build-up or a frame loss, respectively, and
   the first amount is less than the second amount.

14. The RNC of claim 12, further comprising:
   a RLC unit arranged to perform RLC procedures according to 3GPP standard, wherein
   the processing unit is arranged to update the RLC transmission window size by:
      determining the RLC transmission window size based on the calculated data rate;
      generating the RLC STATUS PDU with the RLC transmission window size specified therein for the data flow; and
      forwarding the generated RLC STATUS PDU to the RLC unit.

15. The RNC of claim 12, further comprising:
   a RLC unit arranged to perform RLC procedures according to 3GPP standard, wherein
   the processing unit is arranged to update the RLC transmission window size by:
      intercepting an incoming RLC STATUS PDU for the data flow;
      adding a RLC transmission window size specification to the incoming RLC STATUS PDU when the incoming RLC STATUS PDU does not include the RLC transmission window size specification;
      overwriting the RLC transmission window size specification when the incoming RLC STATUS PDU includes the RLC transmission window size specification; and
      forwarding the modified incoming RLC STATUS PDU to the RLC unit.

16. The RNC of claim 11, wherein the processing unit is arranged to update the RLC transmission window size such that an amount of data corresponding to the RLC transmission window size is substantially equal to an amount of data that can be transferred within a predetermined target round trip time of the Iub TN between the RNC and the Node-B based on the data rate.

17. The RNC of claim 11, wherein the processing unit is arranged to update the RLC transmission window size by:
   determining an actual round trip time of the Iub TN between the RNC and the Node-B using a RNC-Node-B synchronization procedure; and
   updating the RLC transmission window size based on the actual round trip time,
   wherein the RLC transmission window size is such that an amount of data corresponding to the RLC transmission window size is substantially equal to an amount of data that can be transferred within the actual round trip time of the Iub TN based on the data rate.

18. The RNC of claim 11, wherein the processing unit is arranged to update the RLC transmission window size by:
   determining an actual uplink and downlink delays of an Iub TN between the RNC and the Node-B using a RNC-Node-B synchronization procedure; and
   updating the RLC transmission window size based on the actual uplink and downlink delays,
   wherein the RLC transmission window size is such that an amount of data corresponding to the RLC transmission window size is substantially equal to an amount of data that can be transferred within twice the actual uplink or the downlink delay, which ever is greater.

* * * * *

UNITED STATES PATENT AND TRADEMARK OFFICE
CERTIFICATE OF CORRECTION

PATENT NO. : 8,339,962 B2
APPLICATION NO. : 12/740215
DATED : December 25, 2012
INVENTOR(S) : Rácz et al.

It is certified that error appears in the above-identified patent and that said Letters Patent is hereby corrected as shown below:

On the Title Page, item (12), under "United States Patent", in Column 1,
Line 1, delete "Racz" and insert -- Rácz --, therefor.

On the Title Page, item (75), under "Inventors", in Column 1, Line 1,
delete "Sandor Racz, Cegled" and insert -- Sándor Rácz, Cegléd --, therefor.

On the Title Page, item (75), under "Inventors", in Column 1, Line 2,
delete "Skarholmen" and insert -- Skärholmen --, therefor.

On the Title Page, item (75), under "Inventors", in Column 1, Line 3,
delete "Nadas," and insert -- Nádas, --, therefor.

On the Title Page, item (75), under "Inventors", in Column 1, Line 3,
delete "Zoltan" and insert -- Zoltán --, therefor.

In the Specifications:

In Column 1, Line 37, delete "scheduling" and insert -- scheduling. --, therefor.

In Column 1, Line 44, delete "system) Terrestrial" and
insert -- system), Universal Terrestrial --, therefor.

In Column 5, Line 54, delete "a lub" and insert -- an Iub --, therefor.

In Column 6, Line 65, delete "a lub" and insert -- an Iub --, therefor.

In Column 7, Line 43, delete "a example," and insert -- an example, --, therefor.

Signed and Sealed this
Fourteenth Day of May, 2013

Teresa Stanek Rea
*Acting Director of the United States Patent and Trademark Office*

CERTIFICATE OF CORRECTION (continued)
U.S. Pat. No. 8,339,962 B2

In the Claims:

In Column 11, Line 6, in Claim 6, delete "a lub" and insert -- an Iub --, therefor.

In Column 12, Line 31, in Claim 13, delete "the luB" and insert -- the Iub --, therefor.